United States Patent
Akikuni et al.

(10) Patent No.: US 6,552,801 B1
(45) Date of Patent: Apr. 22, 2003

(54) OPTICAL INTERFEROMETER

(75) Inventors: Fumio Akikuni, Tokyo (JP); Keisuke Asami, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 0 days.

(21) Appl. No.: 09/448,944

(22) Filed: Nov. 24, 1999

(30) Foreign Application Priority Data

Nov. 26, 1998 (JP) ............................................. 10-335916

(51) Int. Cl.$^7$ ................................................. G01B 9/02
(52) U.S. Cl. ....................................... 356/498; 356/450
(58) Field of Search ................................. 356/450, 451, 356/455, 498

(56) References Cited

U.S. PATENT DOCUMENTS

| | | | |
|---|---|---|---|
| 4,319,843 A | | 3/1982 | Gornall |
| 4,684,255 A | * | 8/1987 | Ford ............................ 356/455 |
| 5,066,990 A | * | 11/1991 | Rippel ........................ 356/455 |
| 5,133,599 A | | 7/1992 | Sommargren |

FOREIGN PATENT DOCUMENTS

| | | |
|---|---|---|
| JP | 63175734 | 7/1988 |
| JP | 02-157601 | 6/1990 |

OTHER PUBLICATIONS

Examination Report, British Patent Office, Dec. 27, 2002.

* cited by examiner

Primary Examiner—Frank G. Font
Assistant Examiner—Andrew H. Lee
(74) Attorney, Agent, or Firm—Finnegan, Henderson, Farabow, Garrett, & Dunner LLP

(57) ABSTRACT

In an optical interferometer, incident light 1 is divided into reflected light and transmitted light which travel along respective optical paths, which are orthogonal to each other. The reflected light is subjected to total reflection by means of a first reflector 3, and the transmitted light is subjected to total reflection by means of a second reflector 4. The light reflected by the first reflector 3 and the light reflected by the second reflector 4 are again merged by means of the beam splitter 2 into a single ray, and the thus-merged ray falls on a photodetector 5. The optical interferometer is equipped with a third reflector 6 which reflects the incident light 1 at right angles so as to fall on the beam splitter 2, and a fourth reflector 7 which reflects the light, having been transmitted through the beam splitter 2, at right angles so as to fall on the second reflector 4. The beam splitter 2 and the third and fourth reflectors 6 and 7 are mounted on a moving member 8 which can be moved along an optical path extending between the first reflector 3 and the photodetector 5.

7 Claims, 3 Drawing Sheets

→ OPTICAL PATH
←● STAGE MOVEMENT

OPTICAL INTERFEROMETER

BACKGROUND OF THE INVENTION

1. Field of the Invention

The present invention relates to an optical interferometer to be used in the field of, for example, metrology.

2. Description of the Related Art

FIG. 6 is a plan view schematically showing an example configuration of a conventional optical interferometer. In the drawing, reference numeral 1 designates incident light; 2 designates a beam splitter; 3 and 4 designate mirrors; and 5 designates a photodetector.

As shown in the drawing, by means of a beam splitter 2, the incident light 1 is divided into two optical paths which are orthogonal to each other; that is, transmitted light and reflected light. Light reflected by the mirror 3 provided in and oriented at right angles to the optical path for the reflected light and light reflected by a mirror 4 provided in and oriented at right angles to the optical path for the transmitted light are again merged into a single ray by means the beam splitter 2.

At this time, the mirror 3 is moved along the optical path at constant velocity by means of an unillustrated stage on which the mirror 3 is mounted. Consequently, a difference in length arises between the optical path over which the light reflected by the mirror 3 travels and the optical path over which the light reflected by the mirror 4 travels, thus resulting in a variation in the intensity of interference fringes.

The photodetector 5 extracts, as an electric signal, such a variation in the intensity of interference fringes.

As mentioned above, in the above-described conventional optical interferometer, the mirror 3 is moved along its optical path over a long distance, thus resulting in time-consuming operation. Moreover, the accuracy of the optical interferometer must increases with the distance over which the mirror is to travel.

For these reasons, a limitation is imposed on a reduction in the size of and the measurement time required by the conventional optical interferometer. Further, there is also desired an improvement in the optical interferometer in terms of accuracy management.

SUMMARY OF THE INVENTION

Accordingly, an object of the present invention is to provide an optical interferometer of reduced measurement time, and improve measurement accuracy, and facilitated accuracy management.

Another object of the present invention is to provide a compact optical interferometer.

To these ends, according to a first aspect of the present invention, there is provided an optical interferometer, wherein incident light is divided by means of a beam splitter into reflected light and transmitted light which travel along respective optical paths, which are orthogonal to each other; the reflected light is subjected to total reflection by a first reflector and the transmitted light is subjected to total reflection by a second reflector; and the reflected light rays are again merged by the beam splitter into a single ray so as to fall on a photodetector, the interferometer comprising:

a third reflector which reflects the incident light at right angles so as to fall on the beam splitter;

a fourth reflector which reflects the light, having been transmitted through the beam splitter, at right angles so as to fall on the second reflector; and a moving member on which the beam splitter and the third and fourth reflector are mounted and which can be moved along an optical path extending between the first reflector and the photodetector.

The reflector is typified by a mirror. However, a corner cube or a reflector may be used in place of the mirror.

The photodetector extracts, as an electric signal, a variation in the intensity of interference fringes.

The moving member is usually called a stage.

To these ends, according to a first aspect of the present invention, there is provided an optical interferometer, wherein incident light is divided by means of a beam splitter into reflected light and transmitted light which travel along respective optical paths, which are orthogonal to each other; the reflected light is subjected to total reflection by a first reflector and the transmitted light is subjected to total reflection by a second reflector; and the reflected light rays are again merged by the beam splitter into a single ray so as to fall on a photodetector, wherein a moving member on which the beam splitter and the third and fourth reflector are mounted is moved along an optical path extending between the first reflector and the photodetector. Consequently, the optical path over which the light reflected by the first reflector travels and the optical path over which the light reflected by the second reflector travels can be changed simultaneously. Thus, the optical interferometer of the present invention can achieve the same optical path difference as that achieved by the conventional optical interferometer, by employment of a travel distance which is one-half that required by the conventional optical interferometer.

Since the optical interferometer of the present invention requires one-half the travel distance required by the conventional optical interferometer, measurement time can be shortened.

Further, since a required travel distance is short, blurring stemming from movement of the moving member can be diminished. Therefore, there can be realized facilitation of accuracy management of parts, an improvement in measurement accuracy, and miniaturization of the optical interferometer.

Preferably, the optical interferometer further comprises:

a fifth reflector which reflects the light reflected by the beam splitter in a direction parallel to the path of the light reflected by the beam splitter (hereinafter called "in a parallel direction") so as to fall on the first reflector; and a sixth reflector which reflects the light reflected by the fourth reflector in a parallel direction so as to fall on the second reflector, wherein the first and second reflectors are mounted on the moving member.

As mentioned above, the light reflected by the beam splitter is reflected in a parallel direction by means of the fifth reflector so as to fall on the first reflector. Further, the light reflected by the fourth reflector is reflected in a parallel direction by means of the sixth reflector so as to fall on the second reflector. The first and second reflectors are mounted on the moving member on which the beam splitter and the third and fourth reflectors are mounted. Hence, the travel distance can be shortened to one-half that required by the previously-described optical interferometer of the present invention. Accordingly, the travel distance required by the optical interferometer of the present invention can be shortened to one-fourth that required by the conventional optical interferometer.

According to a second aspect of the present invention, there is provided an optical interferometer, wherein incident light is divided by means of a beam splitter into reflected light and transmitted light which travel along respective optical paths, which are orthogonal to each other; the reflected light is subjected to total reflection by a first reflector and the transmitted light is subjected to total reflection by a second reflector; and the reflected light rays are again merged by the beam splitter into a single ray so as to fall on a photodetector, the interferometer comprising:

a third reflector which reflects the light, having transmitted through the beam splitter, at right angles so as to fall on the second reflector; and moving means which synchronously moves the first and second reflectors inn opposite directions so as to approach or depart from each other, along an optical path extending between the first reflector and the photodetector.

As mentioned above, incident light is divided by means of a beam splitter into reflected light and transmitted light which travel along respective optical paths, which are orthogonal to each other; the reflected light is subjected to total reflection by a first reflector and the transmitted light is subjected to total reflection by a second reflector; and the reflected light rays are again merged by the beam splitter into a single ray so as to fall on a photodetector, wherein moving means synchronously moves the first and second reflectors in opposite directions so as to approach or depart from each other, along an optical path extending between the first reflector and the photodetector. Thus, the optical path over which the light reflected by the first reflector travels and the optical path over which the light reflected by the second reflector travels can be changed simultaneously. Since the first reflector and the second reflector can be moved simultaneously in opposite directions, the optical interferometer of the present aspect of the invention can perform measurement within one-half the time required by the conventional optical interferometer.

Since the distance over which each of the first and second reflectors are to move is shortened to one-half that required by the conventional optical interferometer, blurring stemming from movement of reflectors can be diminished, thus facilitating accuracy management of parts and improving measurement accuracy.

Preferably, the moving means comprises a feed screw member having helical threads of opposite hands (hereinafter called "opposite-hand helical threads"), and the feed screw member is disposed in parallel to the optical path extending between the first reflector and the photodetector, the helical thread of one hand being engaged with the moving member having the first reflector mounted thereon and the helical thread of the other hand being engaged with the moving member having the second reflector mounted thereon.

As mentioned previously, a feed screw member is disposed in parallel with the optical path extending between the first reflector and the photodetector and has opposite-hand helical threads. The helical thread of one hand is engaged with a moving member having the first reflector mounted thereon, and the helical thread of the other hand is engaged with another moving member having a second reflector mounted thereon. In addition to yielding the advantageous result yielded by the optical interferometer of the second embodiment, the optical interferometer of the third embodiment yields the advantage of simultaneous movement of the first and second reflectors in opposite directions by means of rotation of the feed screw member.

According to a third aspect of the present invention, there is provided an optical interferometer, wherein incident light is divided by means of a beam splitter into reflected light and transmitted light which travel along respective optical paths, which are orthogonal to each other; the reflected light is subjected to total reflection by a first reflector and the transmitted light is subjected to total reflection by a second reflector; and the reflected light rays are again merged by the beam splitter into a single ray so as to fall on a photodetector, the interferometer comprising:

a third reflector which reflects the light, having transmitted through the beam splitter, at right angles so as to fall on the second reflector; and a moving means on which the first and second reflectors are mounted and which can be moved along the optical path extending between the first reflector and the photodetector.

As mentioned above, by means of a beam splitter, incident light is divided into reflected light and transmitted light which travel along respective optical paths, which are orthogonal to each other; the reflected light is subjected to total reflection by a first reflector and the transmitted light is subjected to total reflection by a second reflector; and the reflected light rays are again merged by the beam splitter into a single ray so as to fall on a photodetector, wherein moving means on which the first and second reflectors are mounted is moved along the optical path extending between the first reflector and the photodetector. As a result of simultaneous movement of the first and second reflectors in a single direction, the optical path over which the light reflected by the first reflector travels and the optical path over which the light reflected by the second reflector travels can be changed simultaneously. Consequently, the optical interferometer of the present invention can achieve the same optical path difference as that achieved by the conventional optical interferometer, within a travel distance which is one-half that required by the conventional optical interferometer.

Thus, since the optical interferometer of the present invention requires one-half the travel distance required by the conventional optical interferometer, measurement time can be shortened.

Further, since the travel distance required is short, blurring stemming from movement of the moving member can be diminished. Therefore, there can be realized facilitated accuracy management of parts and an improvement in measurement accuracy.

Preferably, the optical interferometer further comprises a fourth reflector which reflects the incident light at right angles so as to fall on the beam splitter;

a fifth reflector which reflects the light reflected from the beam splitter in a parallel direction so as to fall on the first reflector;

a sixth reflector which reflects the light reflected from the third reflector in a parallel direction so as to fall on the second reflector; and a second moving member on which the fifth and sixth reflectors are mounted and which can be moved along an optical path extending between the fifth reflector and the photodetector, wherein the beam splitter and the third and fourth reflectors are mounted on the first moving member having the first and second reflectors mounted thereon.

Incident light is reflected at right angles by means of the fourth reflector so as to enter the beam splitter, and the light reflected by the beam splitter is reflected in a parallel direction by a fifth reflector so as to fall on the first reflector. The light, which has been transmitted through the beam splitter, is reflected at right angles by the third reflector. The thus-reflected light is further reflected in a parallel direction by a sixth reflector so as to fall on the second reflector. The third and fourth reflectors are mounted on a first moving member on which the first and second reflectors are mounted, and a second moving member having the fifth and sixth reflectors mounted thereon is moved along the optical path extending between the fifth reflector and the photodetector. In addition to the previously-described advantageous result, the optical interferometer of the present invention requires an advantage of further shortening a required travel distance; i.e., shortening of a travel distance to less than one-half the travel distance required by the conventional optical interferometer.

DETAILED DESCRIPTION OF THE PREFERRED EMBODIMENTS

Embodiments of the optical interferometer according to the present invention will now be described by reference to FIGS. 1 to 5.

First Embodiment

Figure 1:
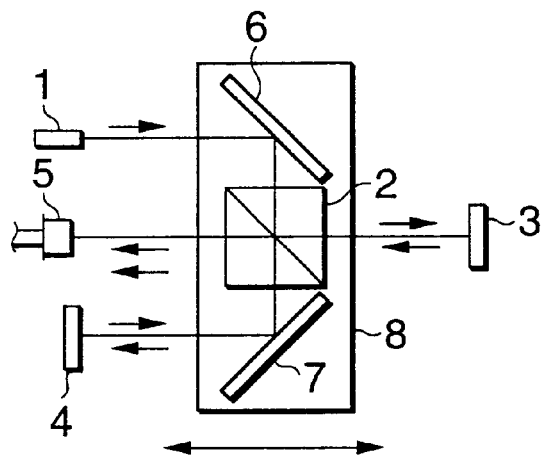
FIG. 1 is a plan view schematically showing an optical interferometer according to a first embodiment of the present invention.
Figure 6:
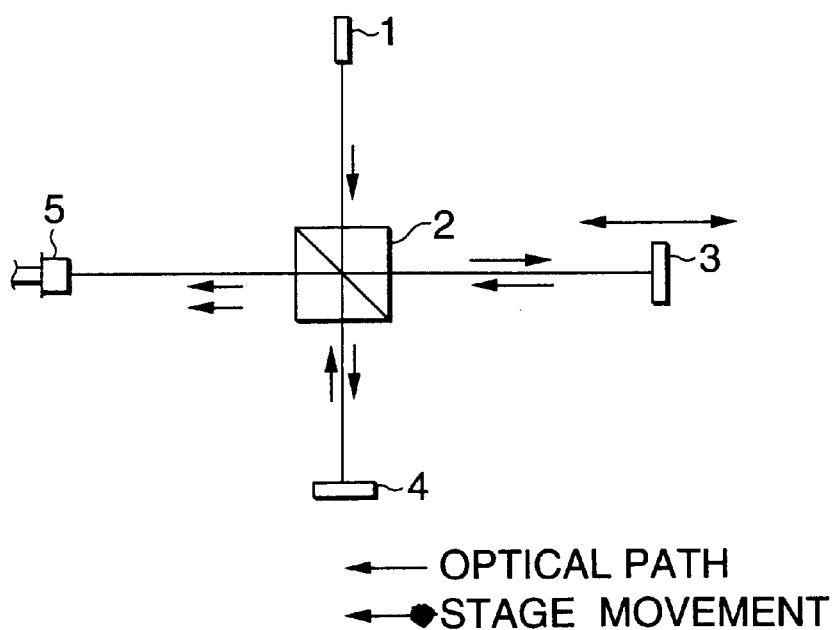
FIG. 6 is a plan view schematically showing a conventional optical interferometer.

FIG. 1 is a plan view schematically showing the configuration of an optical interferometer according to a first embodiment of the present invention. In FIG. 1, as in the case of the conventional optical interferometer shown in FIG. 6, reference numeral 1 designates incident light; 2 designates a beam splitter; 3 and 4 designate mirrors (a first reflector and a second reflector); 5 designates a photodetector; 6 and 7 designate mirrors (a third reflector and a fourth reflector); and 8 designates a stage (a moving member),.

In the present embodiment, the two mirrors 3 and 4, which have already been described in connection with the background art, serve as the first and second reflectors, and other two mirrors 6 and 7 are newly provided in the optical interferometer as the third and fourth reflectors. The beam splitter 2 and the mirrors 6 and 7 are mounted on the stage 8 serving as a moving member.

More specifically, as shown in the drawing, the photodetector 5, the beam splitter 2, and the first mirror 3 are aligned with one another, and the incident light 1 and the second mirror 4 are spaced apart from and oriented in parallel with the photodetector 5.

The third mirror 6 is disposed such that the incident light 1 is reflected at right angles so as to fall on the beam splitter 2.

Further, the fourth mirror 7 is disposed such that the light which has passed through the beam splitter 2 is reflected at right angles so as to fall on the second mirror 4.

As mentioned above, the beam splitter 2 and the third and fourth mirrors 6 and 7 disposed on opposite sides thereof are mounted on the stage 8. As indicated by a thick arrow in the drawing, the stage 8 can travel back and forth along an optical path extending between the first mirror 3 and the photodetector 5, by means of the unillustrated drive source and drive mechanism.

As mentioned previously, the beam splitter 2, in conjunction with the third and fourth mirrors 6 and 7, is moved while being disposed on the stage 8. Consequently, the optical path over which the light reflected by the first mirror 3 travels and the optical path over which the light reflected by the second mirror 4 travels can be changed simultaneously. The optical interferometer of the present embodiment can achieve the same optical path difference as obtained by the conventional optical interferometer, within half the travel distance required by the conventional optical interferometer.

As mentioned above, since the optical interferometer of the present embodiment requires half the travel distance required by the conventional optical interferometer, measurement time can be shortened.

Further, since the required travel distance is short, blurring stemming from movement of the stage 8 can be diminished, thus enabling an improvement in measurement accuracy.

Since the travel distance is short, the optical interferometer can be made more compact.

Second Embodiment

Figure 2:
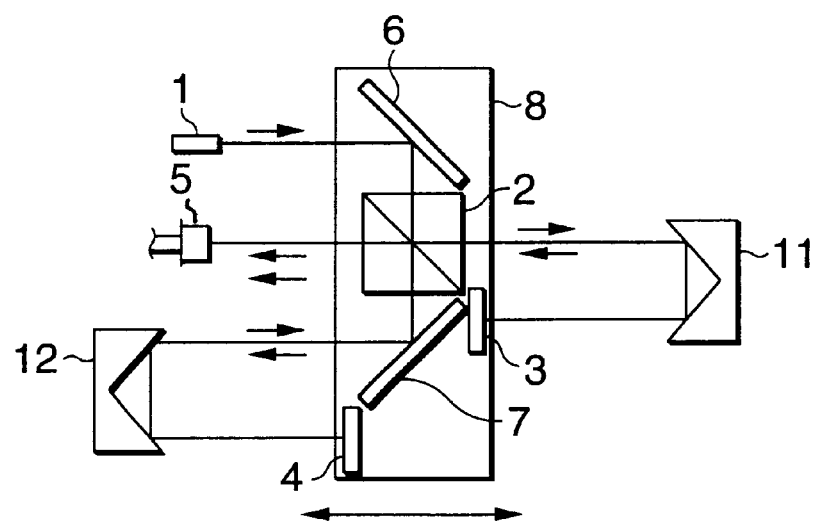
FIG. 2 is a plan view schematically showing an optical interferometer according to a second embodiment of the present invention.

FIG. 2 is a plan view schematically showing the configuration of an optical interferometer according to a second embodiment of the present invention. In FIG. 2, as in the case of the first embodiment, reference numeral 1 designates incident light; 2 designates a beam splitter; 3 and 4 designate mirrors (a first reflector and a second reflector); 5 designates a photodetector; 6 and 7 designate mirrors (a third reflector and a fourth reflector); 8 designates a stage (a moving member); and 11 and 12 designate reflectors (i.e., a fifth reflector and a sixth reflector).

More specifically, as shown in the drawing, the fifth reflector 11 is disposed such that the light reflected by the beam splitter 2 is reflected in a parallel direction. The first mirror 3, which reflects the thus-reflected light, is disposed in proximity to the beam splitter 2 and the fourth mirror 7.

Similarly, the sixth reflector 12 is disposed such that the light reflected by the beam splitter 2 is reflected in a parallel direction. The second mirror 4, which reflects the thus-reflected light, is disposed in proximity to the fourth mirror 7.

The first mirror 3 and the second mirror 4 are mounted on the stage 8 on which the beam splitter 2 and the third and fourth mirrors 6 and 7 are mounted.

As mentioned above, the first through fourth mirrors 3, 4, 6, and 7 and the reflectors 11 and 12 are used in combination. Further, the beam splitter 2 is disposed on the stage 8 having mounted thereon the first to fourth mirrors 3, 4, 6, and 7, and is moved together with the stage 8. Consequently, in addition to yielding the same working-effect as that yielded in the first embodiment, the second embodiment yields the advantage of shortening the travel distance to one-fourth that required by the conventional optical interferometer.

Third Embodiment

Figure 3:
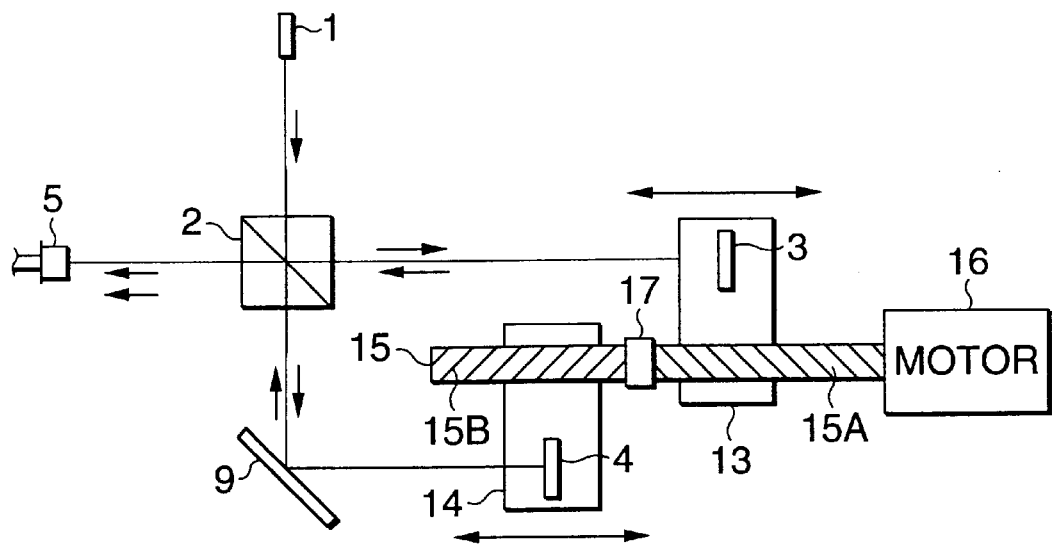
FIG. 3 is a plan view schematically showing an optical interferometer according to a third embodiment of the present invention.

FIG. 3 is a plan view schematically showing the configuration of an optical interferometer according to a third embodiment of the present invention. In FIG. 3, as in the case of the conventional optical interferometer shown in FIG. 6, reference numeral 1 designates incident light; 2 designates a beam splitter; 3 and 4 designate mirrors (a first reflector and a second reflector); 5 designates a photodetector; 9 designates a mirror (a third reflector); 13 and 14 designate stages (moving members); 15 designates a feed screw member; 15A and 15B designate opposite-hand helical threads; and 16 designates a motor (a drive source); and 17 designates a bearing.

In the present embodiment, the two mirrors 3 and 4 serve as the first and second reflectors, and the mirror 9 is newly provided as a third reflector. The optical interferometer of the present embodiment is equipped with movement means for synchronously moving the first and second mirrors 3 and 4 in opposite directions.

More specifically, as shown in the drawing, the first mirror 3 and the photodetector 5 are aligned with the beam splitter 2 in a first direction, and the incident light 1 and the third mirror 9 are aligned in another direction orthogonal to the first direction with the beam splitter 2 being interposed therebetween.

The third mirror 9 reflects the light, which has been transmitted through the beam splitter 2, at right angles so as to fall on the second mirror 4. In the illustrated embodiment, the second mirror 4 is disposed in parallel with the first mirror 3.

The first mirror 3 is mounted on the stage 13 serving as a moving member, and similarly the second mirror 4 is mounted on the stage 14 serving as another moving member.

The means for synchronously moving the first and second mirrors 3 and 4 in opposite directions is constituted of the feed screw member 15 and the motor 16.

The opposite-hand helical threads 15A and 15B, which are threaded in opposite hands, are formed on the feed screw member 15. This feed screw member 15 is disposed in parallel with the optical path extending between the first mirror 3 and the photodetector 5. In the illustrated embodiment, the feed screw member 15 is rotatively driven by the drive source; that is, the motor 16, placed outside of the first mirror 3.

In the feed screw member 15, the helical thread 15A of one hand is engaged with the stage 13 having the first mirror 3 mounted thereon, and the helical thread 15B of the other hand is engaged with the stage 14 having the second mirror 4 mounted thereon. The feed screw member 15 is rotatively supported by the bearing 17 provided at the intermediate point between the opposite-hand helical threads 15A and 15B.

As mentioned above, by means of rotation of the feed screw member 15 having the inverse helical threads 15A and 15B, the first and second mirrors 3 and 4 are synchronously moved in opposite directions; that is, are moved in respective directions such that they approach each other, or in respective directions such that they depart from each other. Accordingly, the length of the optical path over which the light reflected by the first mirror 3 travels and the length of the optical path over which the light reflected by the second mirror 4 travels are changed simultaneously, thus enabling measurement in half the time required by the conventional optical interferometer.

As mentioned above, the measurement time required by the optical interferometer of the present embodiment is shorter than that required by the conventional optical interferometer.

Further, the distance over which each of the first and second mirrors 3 and 4 should travel is shortened to half that required by the mirror in the conventional optical interferometer. Consequently, blurring stemming from movement of the respective stages 13 and 14 can be diminished, thus improving measurement accuracy.

As shown in the drawing, in the third embodiment, the motor 16 is disposed outside of the first mirror 3. However, the motor 16 may be interposed between the stage 14 having the second mirror 4 placed thereon and the third mirror 9.

As mentioned above, if the motor 16 is interposed between the stage 14 of the second mirror 4 and the third mirror 9, the optical interferometer can be made more compact.

Fourth Embodiment

Figure 4:
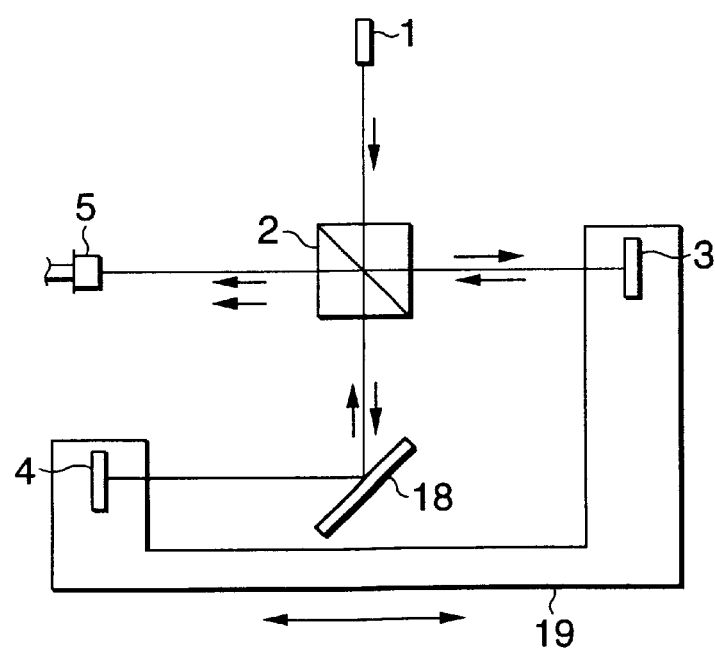
FIG. 4 is a plan view schematically showing an optical interferometer according to a fourth embodiment of the present invention.

FIG. 4 is a plan view schematically showing the configuration of an optical interferometer according to a fourth embodiment of the present invention. In FIG. 4, as in the case of the conventional optical interferometer shown in FIG. 6, reference numeral 1 designates incident light; 2 designates a beam splitter; 3 and 4 designate mirrors (a first reflector and a second reflector); 5 designates a photodetector; 18 designates a mirror (a third reflector); and 19 designates a stage (a moving member).

In the present embodiment, the two mirrors 3 and 4 serve as the first and second reflectors, and the mirror 18 is newly provided as a third reflector. The first and second mirrors 3 and 4 are mounted on the stage 19 serving as a moving member.

Specifically, as shown in the drawing, the beam splitter 2 is aligned with the first mirror 3 and the photodetector 5 in one direction, and the incident light 1 and the third mirror 18 are aligned in another direction orthogonal to the direction, with the beam splitter 2 being interposed therebetween.

The third mirror 18 reflects the light which has been transmitted through the beam splitter 2, at right angles so as to fall on the second mirror 4. In the illustrated embodiment, the second mirror 4 is disposed on the same side of the beam splitter as that on which the photodetector 5 is disposed.

The first and second mirrors 3 and 4 are mounted on the stage 19. As indicated by a thick arrow in the drawing, the stage 19 can travel back and forth along an optical path extending between the first mirror 3 and the photodetector 5, by means of the unillustrated drive source and drive mechanism.

As mentioned previously, the first and second mirrors 3 and 4 are mounted together on the stage 19 and are moved in conjunction with each other. Consequently, the optical path over which the light reflected by the first mirror 3 travels and the optical path over which the light reflected by the second mirror 4 travels can be changed simultaneously. The optical interferometer of the present embodiment can achieve the same optical path difference as that obtained by the conventional optical interferometer, within half the travel distance required by the conventional optical interferometer.

As mentioned above, since the optical interferometer of the present embodiment requires half the travel distance as that required by the conventional optical interferometer, measurement time can be shortened.

Further, since a travel distance required is short, blurring stemming from movement of the stage 19 can be diminished, thus enabling an improvement in measurement accuracy.

As show in the drawing, although in the fourth embodiment the second mirror 4 is disposed on the same side of the beam splitter as that on which the photodetector 5 is disposed, the second mirror 4 may be disposed on the same side on which the first mirror 3 is disposed, in which case the second mirror 4 is oriented in parallel with the first mirror 3. In this case, the third mirror 18 is oriented so that its reflective surface faces generally toward the first mirror 3.

Fifth Embodiment

Figure 5:
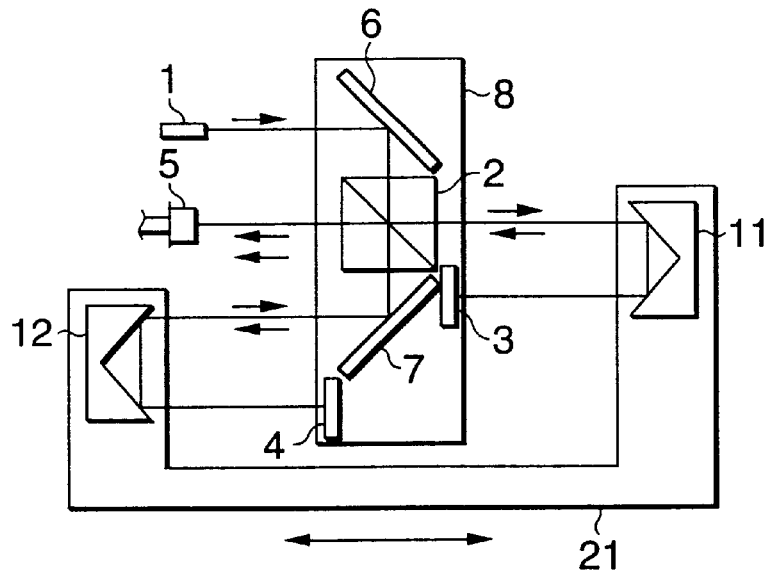
FIG. 5 is a plan view schematically showing an optical interferometer according to a fifth embodiment of the present invention.

FIG. 5 is a plan view schematically showing the configuration of an optical interferometer according to a fifth embodiment of the present invention. In FIG. 5, reference numeral 1 designates incident light; 2 designates a beam splitter; 3 and 4 designate mirrors (a first reflector and a second reflector); 5 designates a photodetector; 6 and 7 designate mirrors (a third reflector and a fourth reflector); 8 designates a stage (a moving member); 11 and 12 designate reflectors (a fifth reflector and a sixth reflector); and 21 designates a stage (a second moving member).

As shown in the drawing, in contrast with the second embodiment, the two reflector 11 and 12 are mounted on the stage 21 serving as a second moving member, provided separately from the stage 8 on which the beam splitter 2 and the first through fourth mirrors 3, 4, 6, And 7 are mounted in conjunction with one another.

As mentioned above, the beam splitter 2 is mounted on the stage 8 in conjunction with the first to fourth mirrors 3, 4, 6, and 7 and is moved together therewith, and the reflectors 11 and 12 are mounted on the stage 21 and are moved together therewith. Therefore, in addition to the working-effect yielded in the second and fourth embodiments, the present embodiment yields the advantage of a further reduction in the travel distance.

In the previous embodiments, the reflectors are constituted of mirrors. However, the present invention is not limited to such a configuration. Other types of reflectors, such as corner cubes, may also be used in place of the mirrors.

Needless to say, the specific dimensions of the elements may be changed, as required.

As has been described above, according to the first aspect of the present invention, a moving member on which a beam splitter and third and fourth reflectors are mounted is moved along an optical path extending between a first reflector and a photodetector. Consequently, the optical path over which the light reflected by the first reflector travels and the optical path over which the light reflected by the second reflector travels can be simultaneously changed. Thus, the optical interferometer of the present invention can achieve the same optical path difference as that achieved by the conventional optical interferometer, by employment of a travel distance which is one-half that required by the conventional optical interferometer.

Since the optical interferometer of the present invention requires one-half the travel distance required by the conventional optical interferometer, measurement time can be shortened.

Further, since a required travel distance is short, blurring stemming from movement of the moving member can be diminished. Therefore, there can be realized facilitation of accuracy management of parts, an improvement in measurement accuracy, and miniaturization of the optical interferometer.

Preferably, the light reflected by the beam splitter is reflected in a direction parallel to the path of the light reflected by the beam splitter by means of the fifth reflector so as to fall on the first reflector. Similarly, the light reflected by the fourth reflector is reflected in a parallel direction by means of the sixth reflector so as to fall on the second reflector. The first and second reflectors are mounted on the moving member on which the beam splitter and the third and fourth reflectors are mounted. Hence, in addition to the working-effect yielded by the first aspect of the present invention, the travel distance can be shortened to one-half that required by the previously-described optical interferometer of the present invention. Accordingly, the travel distance required by the optical interferometer of the present invention can be shortened to one-fourth that required by the conventional optical interferometer.

According to a second aspect of the present invention, by means of rotation of the feed screw member having the opposite-hand helical threads, the first and second reflectors are moved synchronously in opposite directions; that is, are moved in respective directions such that they approach each other, or in respective directions such that they depart from each other. Thus, the optical path over which the light reflected by the first reflector travels and the optical path over which the light reflected by the second reflector travels can be changed simultaneously. Since the first reflector and the second reflector can be simultaneously moved in opposite directions, the optical interferometer of the present invention can perform measurement within one-half the time required by the conventional optical interferometer.

Since the distance over which each of the first and second reflectors are to move is shortened to half that required by the conventional optical interferometer, blurring stemming from movement of reflectors can be diminished, thus facilitating management of accuracy of parts and improving measurement accuracy.

Preferably, a feed screw member is disposed in parallel with the optical path extending between the first reflector and the photodetector and has opposite-hand helical threads. The helical thread of one hand is engaged with a moving member having the first reflector mounted thereon, and the helical thread of the other hand is engaged with another moving member having a second reflector mounted thereon. In addition to yielding the advantageous result yielded by the optical interferometer of the second aspect, the optical interferometer of the present invention yields the advantage of simultaneous movement of the first and second reflectors in opposite directions by means of rotation of the feed screw member.

According to a third aspect of the present invention, a moving member on which the first and second reflectors are mounted is moved along the optical path extending between the first reflector and the photodetector. As a result of simultaneous movement of the first and second reflectors in a single direction, the optical path over which the light reflected by the first reflector travels and the optical path over which the light reflected by the second reflector travels can be changed simultaneously. Consequently, the optical interferometer of the present invention can achieve the same optical path difference as that achieved by the conventional optical interferometer, within a travel distance which is one-half that required by the conventional optical interferometer.

Thus, since the optical interferometer of the present invention requires one-half the travel distance required by the conventional optical interferometer, measurement time can be shortened.

Further, since the travel distance required is short, blurring stemming from movement of the moving member can be diminished. Therefore, there can be realized facilitated accuracy management of parts and an improvement in measurement accuracy.

Preferably, incident light is reflected at right angles by means of a fourth reflector so as to enter the beam splitter, and the light reflected by the beam splitter is reflected in a parallel direction by a fifth reflector so as to fall on the first reflector. The light, which has been transmitted through the beam splitter, is reflected at right angles by the third reflector. The thus-reflected light is further reflected in a parallel direction by a sixth reflector so as to fall on the second reflector. The third and fourth reflectors are mounted on a first moving member on which the first and second reflectors are mounted, and a second moving member having the fifth and sixth reflectors mounted thereon is moved along the optical path extending between the fifth reflector and the photodetector. In addition to the previously-described advantageous result, the optical interferometer of the present aspect further yields an advantage of further shortening required travel distance; i.e., shortening of a travel distance to less than one-half the travel distance required by the conventional optical interferometer.

What is claimed is:

1. An optical interferometer, comprising:
  a beam splitter that divides incident light into reflected light and transmitted light which travel along respective optical paths, which are orthogonal to each other;
  a first reflector that subjects said reflected light from said beam splitter to total reflection and directly returns said reflected light to said beam splitter;
  a photodetector;
  a second reflector that subjects said transmitted light to total reflection, after which said reflected light and said transmitted light subject to total reflection are merged at the beam splitter into a single ray of light to fall on said photodetector;
  a third reflector which reflects light from an external source at right angles so as to make said incident light fall on said beam splitter;
  a fourth reflector which reflects said transmitted light at right angles so as to fall on the second reflector; and
  a moving member on which said beam splitter and said third and fourth reflectors are mounted and which is movable along an optical path extending between said first reflector and said photodetector.

2. The optical interferometer as defined in claim 1, further comprising:
  a fifth reflector which reflects said reflected light from said beam splitter in a direction parallel to the path of said reflected light from beam splitter so as to fall on said first reflector; and
  a sixth reflector which reflects said transmitted light from said fourth reflector in a parallel direction so as to fall on said second reflector, wherein said first and second reflectors are mounted on the moving member.

3. The optical interferometer as defined in claim 1, wherein a surface direction of a semi reflective surface disposed in the beam splitter is orthogonal to a surface direction of a reflective surface of the fourth reflector.

4. An optical interferometer comprising:
  a beam splitter that divides incident light into reflected light and transmitted light which travel along respective optical paths, which are orthogonal to each other;
  a first reflector that subjects said reflected light to total reflection;
  a photodetector;
  a second reflector that subjects said transmitted light to total reflection, after which said reflected light and the transmitted light subject to total reflection are merged at the beam splitter into a single ray of light to fall on said photodetector;
  a third reflector which reflects said transmitted light at right angles so as to fall on said second reflector; and
  moving means which synchronously moves said first and second reflectors in opposite directions so as to approach or depart from each other, along an optical path extending between said first reflector and said photodetector.

5. The optical interferometer as defined in claim 4, wherein said moving means comprises a feed screw member having helical threads of opposite hands, and said feed screw member is disposed in parallel to the optical path extending between said first reflector and said photodetector, said helical thread of one hand being engaged with said moving member having said first reflector mounted thereon and said helical thread of the other hand being engaged with said moving member having said second reflector mounted thereon.

6. An optical interferometer comprising:
  a beam splitter that divides incident light into reflected light and transmitted light which travel along respective optical paths, which are orthogonal to each other;
  a first reflector that subjects said reflected light to total reflection;
  a photodetector;
  a second reflector that subjects said transmitted light to total reflection, after which the reflected light and the transmitted light subject to total reflection are merged at the beam splitter into a single ray of light to fall on said photodetector;
  a third reflector which reflects the transmitted light at right angles so as to fall on said second reflector; and
  moving means on which said first and second reflectors are mounted and which can be moved along the optical path extending between said first reflector and said photodetector.

7. The optical interferometer as defined in claim 6, further comprising:
  a fourth reflector which reflects the incident light at right angles so as to fall on said beam splitter;
  a fifth reflector which reflects said reflected light from said beam splitter in a parallel direction so as to fall on said first reflector;
  a sixth reflector which reflects the light reflected from said third reflector in a parallel direction so as to fall on said second reflector;
  a photodetector; and
  a second moving member on which said fifth and sixth reflectors are mounted and which can be moved along an optical path extending between said fifth reflector and said photodetector;
  wherein said beam splitter and said third and fourth reflectors are mounted on said moving means having said first and second reflectors mounted thereon.

* * * * *